May 8, 1962 E. J. POLTORAK 3,033,733
METHOD AND APPARATUS FOR FORMING FLEXIBLE
SEALS OF IRREGULAR CONTOUR
Filed June 26, 1958 2 Sheets-Sheet 2
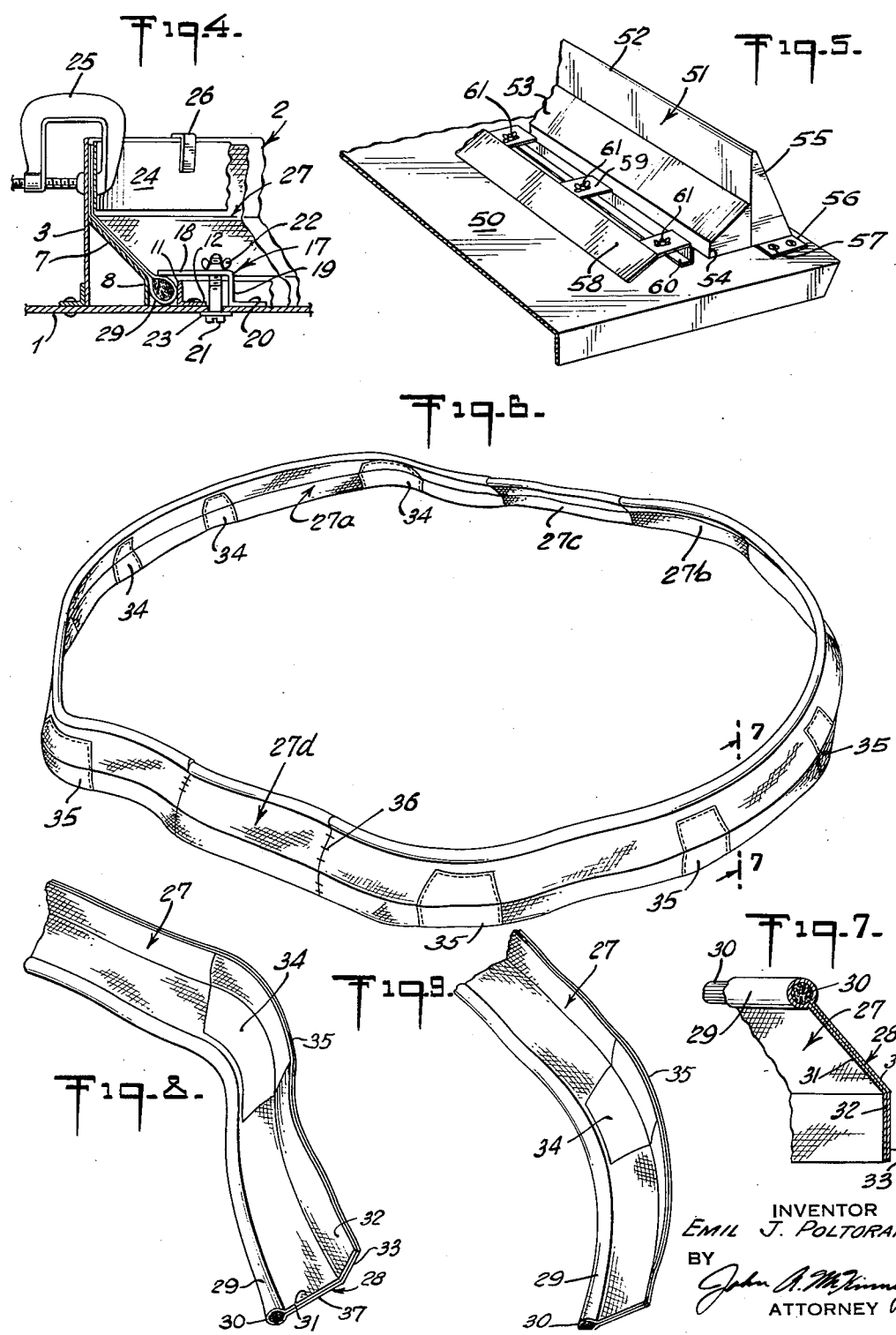
INVENTOR
EMIL J. POLTORAK
BY
John A. McKinney
ATTORNEY United States Patent Office 3,033,733
Patented May 8, 1962

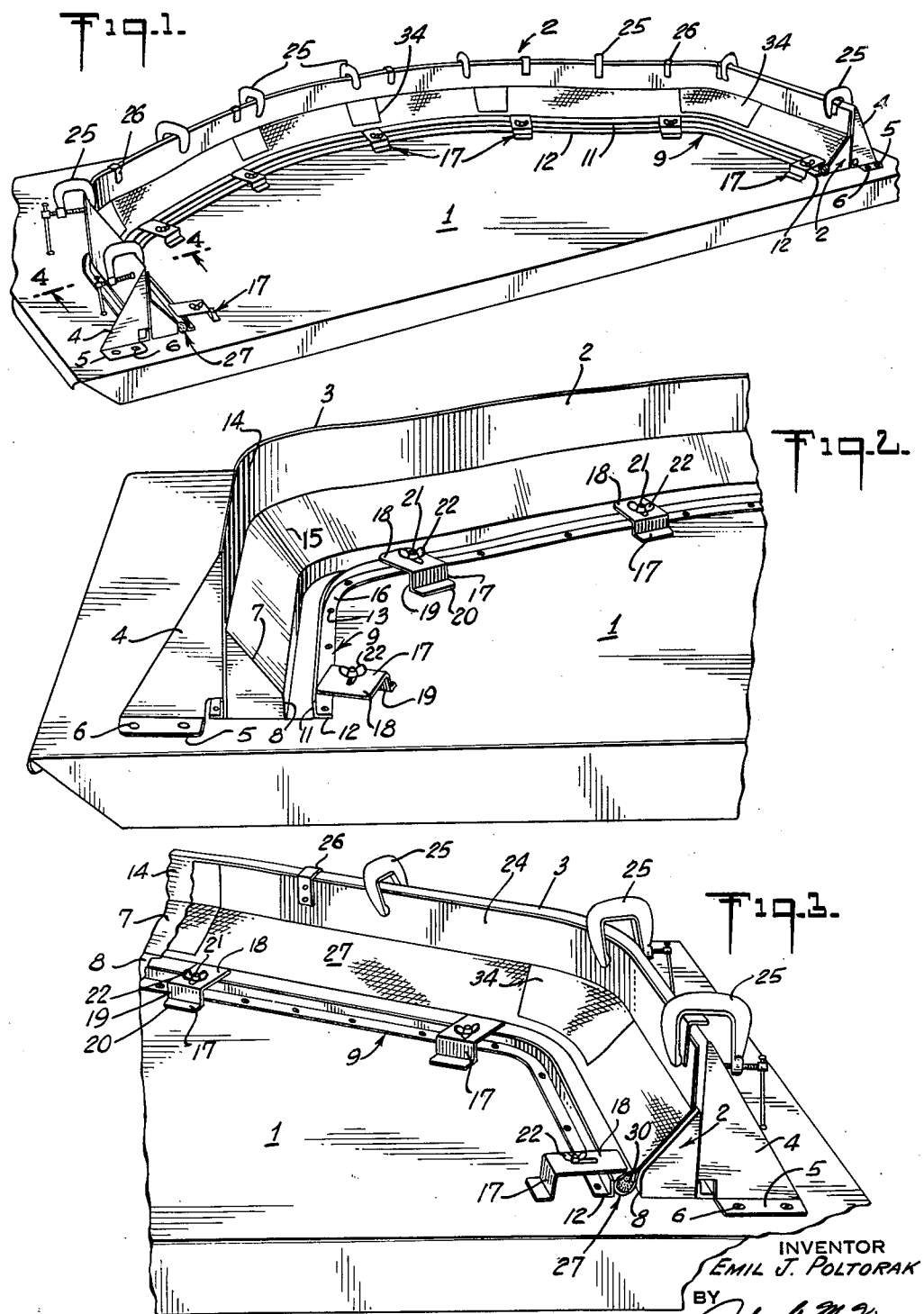

3,033,733
METHOD AND APPARATUS FOR FORMING FLEXIBLE SEALS OF IRREGULAR CONTOUR
Emil J. Poltorak, Somerville, N.J., assignor to Johns-Manville Corporation, New York, N.Y., a corporation of New York
Filed June 26, 1958, Ser. No. 744,864
13 Claims. (Cl. 156—211)

This invention relates to a method and apparatus for forming a seal to be used in blocking or impeding the passage between two structures.

Heretofore, when it was desired to seal off a passage between two structures by flexible seals and wherein the structures were of irregular contour, both in a lateral direction and in a longitudinal direction, complicated apparatus, such as, for example, mating dies and the like, had to be resorted to in order to form such seals. The seals, thus formed, are required to conform to the longitudinal contours of one of the members and also to conform to the variable gap between the two members. Constructions such as these are found, for example, in aircraft engines wherein it is necessary to seal off the passage between the engine housing and a pre-shaped structural thermal insulation commonly employed in the fuselage and referred to in the trade as a "shroud" to prevent leakage of gases, oil, and fuel from one of these areas to another. Because of the design of the engine, its outer periphery commonly is not circular but is formed with a plurality of valleys or grooves so that sealing the gap between the engine and the shroud by the ordinary circular type or annular type of seals is inadequate. The design of the aircraft is such that the shroud usually also follows the approximate contour of the engine; however, often the shroud is circular and the periphery of the engine of irregular contour, so that the gap between the two structures is of varying dimensions. As noted, prior methods of forming seals to be used in the subject or similar structures necessitated the construction of a complicated pair of bulky, expensive mating dies which followed the contour of at least one of the members. A sealing material, such as, for example, asbestos cloth, asbestos wire inserted cloth, or the like, was inserted between the dies, and, under a predetermined degree of heat and pressure, the sealing material received a permanent set therein which followed the contour of either the shroud or the engine or both.

An object of this invention therefore is a novel method and apparatus for forming seals of irregular shape and contour.

Another object of this invention is a novel apparatus to be used in the manufacture of seals, and like structures, which is relatively inexpensive to fabricate thereby providing a low initial cost, is readily replaceable in sections in the event of design change in the contour of the seal, and is relatively light-weight in structure so that it can be easily and readily transported.

Another object of this invention is a novel method for making seals and the like which reduces appreciably the cost of making such seals as compared to prior methods used in fabricating seals of this type.

In brief, the invention comprises a metallic form of irregular contour, both in a transverse and in a longitudinal direction, to which the seal to be formed is clamped to impart thereby to the seal a permanent set conforming to the irregular contours of the form. To prevent wrinkles or bends in the material due to the changes in contour, cutouts are made in the sealing material and replaced by inserts or patches, of the proper shape and size, which more readily allow a change in contour without producing such wrinkles or bends when the set is created in the seal. While in the form, the seal may be subjected to heat to cure or vulcanize the coating on the seal to impart thereby to the seal its design characteristics of heat and oil resistance, for example, and also to give to the seal a more permanent set.

These and other objects will be readily apparent from an examination of the foregoing and the following more detailed description and attached drawings wherein:

FIG. 1 is a pictorial view of a form with a seal clamped thereto;
FIG. 2 is an enlarged pictorial view of a portion of the form of FIG. 1;
FIG. 3 is an enlarged pictorial view of another portion of the form showing the sealing material mated thereto;
FIG. 4 is a cross-sectional view along lines 4—4 of FIG. 1;
FIG. 5 is a pictorial view of a form used in making the smaller sections of an annular seal;
FIG. 6 is a pictorial view of a completely assembled seal;
FIG. 7 is a cross-sectional view along the lines 7—7 of FIG. 6; and
FIGS. 8 and 9 are pictorial views of typical formed shapes of seals fabricated according to the present invention.

Referring to FIGS. 1-4, a base 1 has extending therefrom, in an approximately vertical direction, a form or jig 2, which is the subject of the present invention. The form comprises a vertical member 3 extending from the base at an approximate right angle and supported thereon by legs 4 having flanges 5 clamped or secured to the base by conventional securing means 6, as for example screws, or nuts and bolts. Angle strip or plate 7 is welded, or otherwise secured, at one edge to the approximate midpoint of one of the faces of the member 3; it extends downwardly toward the base forming an acute angle with member 3 and terminates in a vertical bar 8 secured or merely mated to the base or frame 1. Spaced from the vertical bar 8 is a runner 9, having vertical leg 11 approximately parallel to the vertical bar 8 and horizontal leg 12 secured to the base 1 by conventional securing means 13. Due to the juncture and shape of the various elements, the form is thereby of an irregular contour in a transverse direction, or in a direction extending upwardly from base 1, and the form is also of an irregular contour in a longitudinal direction or in a direction parallel to the base. Thus, bends or changes of direction or of contour, as, for example, 14, 15, 16 in the form illustrated in FIG. 2, are given to the vertical bar 3, to the angle strip 7, and to the runner 9 at periodic intervals, so that the complete form for one section of the seal forms an approximate semicircle.

Clamps 17 are used to assist in retaining the seals within the valley formed between bar 8 and vertical leg 11; each clamp comprises an upper horizontal strip 18 connected to a lower horizontal strip 20 by a vertical segment 19. Bolt 21 is passed through an aperture in the upper strip 18 and a corresponding aperture in base 1, and has a nut fastener 22 at one end thereof. Washer 23 is placed adjacent the head of the bolt 21 to prevent the bolt slipping through the base. In securing the seal to the form 2, the nut and bolt 21, 22 are loosened, and one end of the seal 27 is placed between the valley or gap formed between runner 9 and bar 8. The upper horizontal strip 18 is rotated until it is superimposed on or in engagement with the portion of the seal within this gap. Nut and bolt 21, 22 are tightened, and the portion of the seal adjacent the securing means is thereby tightly held to the adjacent section of the form and to the base 1.

The upper portion of the seal is retained against the form 2 by a fastening or facing strip 24 having overhanging clips 26 attached thereto; the seal is tightly secured or mated to the form by a plurality of C clamps 25 placing the vertical bar 3 and facing strip 24 in tight engagement.

The particular seal may be of various forms of cross-sectional shapes to fit particular requirements; however, in the present construction, a type of seal 27 having roughly the shape of a tadpole in cross-section was formed to give the results desired. This type of seal comprises a bulbous portion 29 and a tail section 28 (FIGS. 4 and 7). Within the bulbous portion 29 is inserted a core cable of wire mesh, or any other desired material. The tail section 28 comprises a pair of faces 31, 37 extending from the bulb 29 and lip faces 32, 33 extending at an angle from faces 31, 37 respectively.

To reduce the cost of manufacture and also to make the seals readily conducive to a design change, the forms are made in sections. In FIG. 1 one of the larger sections has been illustrated. Ordinarily a somewhat similar form is also made and connecting forms, as illustrated in FIG. 5, are used to produce small seal sections to connect the larger sections fabricated in the larger forms. These smaller forms are made in a manner similar to the larger form, illustrated and described. Thus, referring to FIG. 5, a base 50 has attached thereto a jig or form 51; the form comprises a vertical plate or bar 52, angle plate or strip 53, vertical bar 54, leg 55, flange 56 and securing means 57 similar to the corresponding structure and for the same purpose as described in the construction of FIG. 1. Spaced from vertical bar 54 is an L shaped runner 60 secured to the base 50. A bar 58 has a plurality of flange extensions 59 in engagement with the upper portion of runner 60; the bar 58 extends at an acute angle from base 50 and has securing means 61 passing through the extensions and the frame. Similar to the prior construction described, that portion of the seal between runner 60 and vertical strip 54 is secured to the base 50 by the tightening of securing means 61 after movement and placement of the flanges 59 over a seal segment between the runner and strip 54.

Typical shapes formed by the present invention are illustrated in FIGS. 8 and 9. It is seen that the seals formed vary in cross-sectional contour in a transverse direction and also in a longitudinal direction.

In forming a seal according to the present invention, a type of seal having a cross-sectional shape resembling a tadpole has its tail 28 extending from the bulb 29. Prior to forming, the faces 31 and 32 are continuous and faces 37 and 33 are continuous. Before faces 31 and 32 are adhered to faces 37 and 33, respectively, a plurality of inserts (not shown) are placed between the faces at selected areas corresponding to changes in contour of the tail. The areas adjacent the inserts are refreshed with cement, and, after the mating tail portions are adhered by applying pressure, preferably with a roller, the inserts are removed thereby producing non-adhering areas at selected intervals along the length of the seal. If the seal were to be placed in the form, these non-adhering areas would lie approximately adjacent the changes of longitudinal contour 14, 15, and 16 of the form. Prior to insertion, however, the non-adhering areas along faces 31, 32 are cut out, and a similar, but slightly larger, cutout is made in the opposite non-adhering area in continuous faces 37, 33. Since in forming the annular seal, one side of the tail would be considered the inner periphery of the complete seal and the opposite side would be considered the outer periphery of the seal, the cutouts are made of different sizes. Thus, as viewed in FIG. 6, the cutouts opposite areas or patches 34 are relatively smaller than the cutouts opposite patches 35 on the outer periphery. After the cutouts are made, patches 34, 35 are cut on the bias from the basic seal material sheet and are adhered to the seal to cover the cutout areas as noted.

The seal is then placed in the form 2 with the bulb 29 lying between bar 8 and runner 9. Clamp 17 is rotated until strip 18 is superimposed over the bulb; the clamp is tightened thereby securing the bulb to the base by adjustment of nut and bolt 21, 22. The remaining clamps are similarly secured. The tail 28 of the seal is pressed firmly against strip 7 and vertical bar 3 to have the seal follow closely the contours of the form. With such securement, patches 34, 35 lie opposite either sharp or gradual changes of longitudinal contour of the form. Facing strip 24 is subsequently placed on the form so that the clips overhang the lip of bar 3; C clamps 25 are placed at a plurality of points along strip 24 and are tightened. During tightening, the seal 27 receives a set according to the irregular contour of the form 2.

If desired, various types of coatings may be applied to the seal 27 prior to insertion in the form, and the seal, while still in the form, may be placed in a heat curing oven thereby to cure not only the various coatings thereon but also the adhesives and also to impart a more permanent set to the seal 27. After setting and heat curing, the section of the seal 27 is removed from the form and may be stitched, as at 36, to other seal sections, similarly formed in another relatively large form or in small forms for fabricating the connecting sections, to create a continuous annular seal (FIG. 6), or the seal may be shipped in the finished segments for assembly by the customer. The seal, thusly created, is now ready for use.

In the specific example of the invention, a flat, planar sheet-like piece of metallic wire (such as that commercially known as Inconel) inserted, asbestos cloth was coated on both sides with a flame and oil resistant neoprene compound. The cloth was cut to the required width and length and marked on one side thereof for the cutouts later to be made. The core cable 30 was placed in the approximate center of the cloth on the side opposite the marked cutouts, and non-adhesive strips of Holland cloth were mated, on the same side, opposite the marked cutouts. The remaining areas of the seal were refreshed with cement and the construction of tadpole, cross-sectional shape was formed with the core cable forming the bulb 29 and with the non-adhesive strips or inserts sandwiched in the tail 28. The inserts were then removed, and the cutouts were made in opposing faces adjacent the non-adhering areas of the tail following the pattern of the markings. Patches 34, 35 were cut on the bias from the basic sheet cloth, were refreshed with adhesive, and adhered to the proper areas of the "tadpole" seal to cover the cutouts made.

The "tadpole" seal thus formed, was inserted in the form 2 as noted. C clamps 25 were tightened and the "tadpole" seal received a set according to the variable contour of the form 2. The seal was removed from the form 2 and coated with a heat-resistant aluminum paint. The seal was reinserted and clamped to the form, and the entire structure was placed in an oven and cured for 30 minutes rise to 280° F. and 90 minutes at 280° F. After cooling, the "tadpole" seal was removed from the form 2, trimmed, and again coated with a heat-resistant aluminum paint. The seal was again subjected to cure in the oven for 30 minutes rise to 280° F. and 30 minutes at 280° F.

Other types of cloth may be substituted for the wire asbestos cloth recited in the specific example, as, for example, common asbestos cloth without wires embedded therein. Likewise, other elastomers can be used in lieu of the neoprene utilized herein, as, for example, silicone or Buna-N compound; of course, the curing procedures must be adjusted according to the elastomer used, as is well understood in the art. The specific type of non-adhesive strip was Holland cloth; similarly, other substitutes may be used, as, for example, polyethylene. It is thus seen that the invention recited herein resides in the method and apparatus used in forming a seal of a particular shape to obtain the results desired rather than in the specific ingredients making up the seal or which are used in conjunction with the seal.

It is also readily evident that changes in the shape of the seals can be made easily, inexpensively and quickly corresponding to changes made in the structure or structures to be sealed. As an example, the contour of the outer periphery of one engine was redesigned several times during development resulting in a change in the contour of the seal. A seal was readily produced merely by substituting for certain sections of the form redesigned sections of the proper contour, which redesigned sections, when combined with the remaining sections, produced a seal of a desired size and proper contour.

In the example illustrated, the height of member 3 and slanted sections 7 are constant; however, these heights may be made variable depending upon the gap to be sealed. Thus, in the use described, the gap between the engine and the shroud may be variable. The changes in the gap dimension are compensated for by alteration of the heights of sections 7 and/or plate or bar 3 at the appropriate locations.

Having thus described the invention in rather full detail, it will be understood that these details need not be strictly adhered to and that various changes and modifications may suggest themselves to one skilled in the art, all falling within the scope of the invention as defined by the subjoined claims.

What I claim is:

1. A method for forming a seal of irregular shape comprising placing non-adhering inserts between selected sections of facing planar faces of sheet seal material, adhesively securing the mating planar faces, removing the non-adhering inserts from the sections, cutting out portions of the faces of the seal material at the selected non-adhering sections, adhering patches, each having a different configuration than its corresponding cut out portion, to the planar faces to cover the cutout sections, placing the seal thus formed into a form, and conforming the seal to the contour of the form.

2. A method for forming a seal of irregular shape comprising cutting a planar sheet of seal material to the desired size, cutting out selected portions of the sheet material, adhering patches over such cutout portions, each of said patches having an area greater than its corresponding cut out portion, placing the material into a form of irregular contour, and conforming the material to the irregular contours of the form thereby to impart to the material a set of irregular shape corresponding in contour to that of the form.

3. A method for forming a seal of irregular shape comprising cutting a planar sheet of seal material to the desired width and length, inserting a core lengthwise of the material, placing a non-adhering material at selected areas of the seal material, folding the seal material about the core and adhering the mating faces, removing the non-adhering material from between the faces, cutting away the seal material at the non-adhering areas, adhering patches of seal material around the cutouts made to cover the same, each of said patches having an area greater than its corresponding cut out, placing the seal material in a form, and shaping the seal material to the contour of the form with the patches of material mating with changes of contour in the form.

4. A method for shaping a seal having a pair of mating, planar faces and having changes of contour both in a lateral and in a longitudinal direction comprising placing a planar sheet of seal material in a form having an irregular contour in a longitudinal and transverse direction, cutting away portions of the seal material adjacent contour changes of the form, and replacing such cutout portions with adhering patches, each of said patches having an area greater than its corresponding cut out portions, on both planar faces of the material.

5. A method for forming a seal of generally tadpole shape in cross-section having a bulbous portion and a pair of mating, approximately planar faces forming a tail comprising cutting away opposite, selected portions of the mating faces, covering the cutout portions with adhering patches on both faces, each of said patches having an area greater than its corresponding cut out portion, and placing the seal in a form having irregular contours both in a transverse and in a longitudinal direction with the patches being placed opposite changes in contour of the form.

6. A method for forming a seal having an irregular contour from a planar sheet of material comprising cutting away selected portions of the sheet of seal material, filling the cutout portions with patches of seal material, each of said patches having a configuration different from its corresponding cut out portion placing the seal material in a form having changes of contour both in a lateral and a longitudinal direction with the sheet being placed so that the covered areas are mated with portions of the form having a change in contour, and applying pressure to the seal material to create a set to the material conforming to the contour of the form.

7. The method of claim 6 further including covering the material with heat resistant and oil resistant coating material, and curing the coating material to form a permanent set in the material conforming to the contour of the form.

8. A form for shaping seals comprising a base, a section extending outwardly from said base, said section being of irregular contour which deviates from a geometric configuration, a second section extending at an angle from the vertical section toward the base, each of said sections being removably secured to said base and seal retaining means on the base adjacent the approximate juncture of the second section and the base.

9. A form for shaping seals comprising a base, a member extending upward from said base and against which the seal is to be placed for shaping, said member having an irregular contour in the transverse direction and also in the longitudinal direction, said member also having a plurality of sections, each of which is removably secured to said base, seal clamping means adjacent the juncture of the member and the base, and additional clamping means on the member for retaining of the seal against the upwardly extending member.

10. A method for forming a seal of irregular shape from elongate strip material, said material being looped to form a bulbous portion and the opposing ends terminating in mutually engaging relation, comprising: placing non-adhering inserts between selected portions of said opposing ends to prevent adhering of said selected portions; removing said inserts; cutting away the non-adhering portions, adhering patches of seal material to the areas adjacent the cut out portions, each patch having an area greater than its corresponding cut out portion; and exerting pressure to cause the seal to conform to the irregular contour of a form having a shape which deviates from a geometric configuration.

11. A form for the manufacture of seals from elongate strip material, said material being looped to form a bulbous portion and having its opposing ends terminating in mutually engaging relation, comprising in combination: a base; a first member having an upstanding portion forming an inner retaining peripheral wall for said bulbous portion; a second member having a first and upstanding face forming an outer peripheral retaining wall for said bulbous portion, said second member also having a second face extending angularly from said upstanding face and supporting a portion of said mutually engaging ends; a third member having a face extending angularly from said second face of said second member for receiving a second portion of said mutually engaging ends; and means for confining said second portion to said face of said third member, each of said members being removably secured to said base, and having a periphery which deviates from a geometric configuration.

12. A form for the manufacture of seals from elongate strip material, which comprises in combination: a base;

retention means for retaining a peripheral edge of said material to said base; a first backing plate having a face extending angularly from said base; and a second backing plate extending angularly from said first backing plate, each of said retention means and said first and second backing plates having corresponding radii of curvatures along predetermined portions of their peripheral lengths, and each being removably secured to said base.

13. A method for forming a seal of irregular shape from elongate strip material, said material being looped and having its opposing ends in mutually engaging relation to form a bulbous portion, an intermediate, and a terminal portion, comprising: confining the bulbous portion between a pair of upstanding faces while supporting the intermediate portion in an angular plane and confining the terminal portion in a plane different from the supporting plane of the intermediate portion; placing non-adhering inserts between selected portions of said opposing ends to prevent adhering of said selected portions; removing said inserts; cutting away the non-adhering portions; and adhering patches of sealing material to the areas adjacent the cutout portions, each patch having an area greater than its corresponding cutout portion and spanning said cutout portion.

References Cited in the file of this patent

UNITED STATES PATENTS

| | | |
|---|---|---|
| 1,946,244 | Smith | Feb. 6, 1934 |
| 2,004,652 | Dempsey | July 11, 1935 |
| 2,075,858 | McKay | Apr. 6, 1937 |
| 2,110,303 | Marshall | Mar. 8, 1938 |
| 2,172,111 | Schick | Sept. 5, 1939 |
| 2,189,795 | Hartbauer | Feb. 13, 1940 |
| 2,533,742 | Poltorak | Dec. 12, 1950 |
| 2,700,410 | Axton | Jan. 25, 1955 |
| 2,716,625 | Scholl | Aug. 30, 1955 |
| 2,754,355 | Bartlett | July 10, 1956 |
| 2,766,055 | Poltorak | Oct. 9, 1956 |
| 2,801,947 | Winchester et al. | Aug. 6, 1957 |
| 2,915,427 | Schriner et al. | Dec. 1, 1959 |